Nov. 25, 1969  J. D. KING  3,480,907
NEUTRALLY BUOYANT HYDROPHONE STREAMER
Filed Dec. 29, 1967
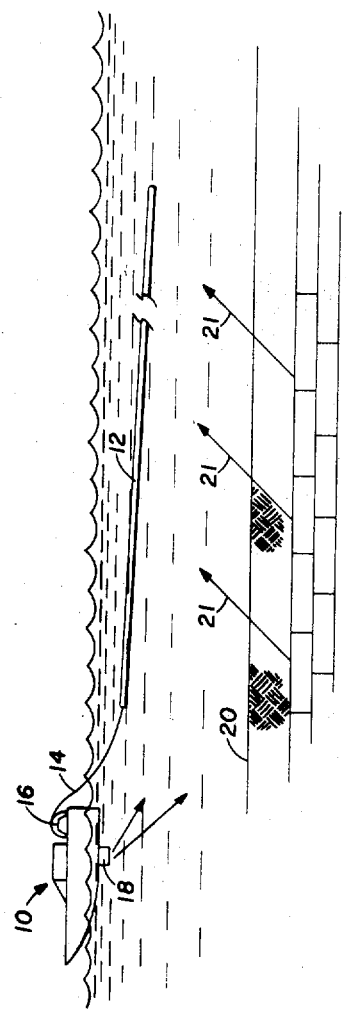
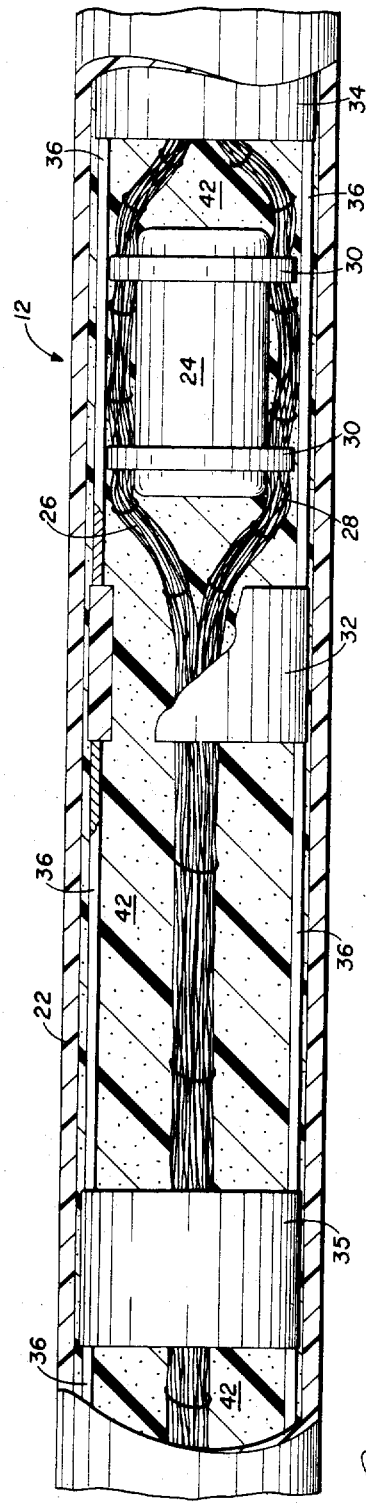
INVENTOR
JOEL D. KING
ATTORNEY

United States Patent Office 3,480,907
Patented Nov. 25, 1969

3,480,907
NEUTRALLY BUOYANT HYDROPHONE STREAMER
Joel D. King, Mesquite, Tex., assignor to Texas Instruments Incorporated, Dallas, Tex., a corporation of Delaware
Filed Dec. 29, 1967, Ser. No. 694,532
Int. Cl. H04b *13/00*
U.S. Cl. 340—9      13 Claims

ABSTRACT OF THE DISCLOSURE

An elongated hollow jacket towable underwater by a marine vessel includes a plurality of hydrophones spaced along the interior thereof. Solid polymeric material having a plurality of discrete air-filled particles distributed throughout fills all remaining space within the hollow jacket to provide a uniform cross-sectional hydrophone streamer having a specific gravity approximating the specific gravity of the surrounding water. The hydrophone streamer is thus neutrally buoyant and may be towed underwater at a selected depth without the requirement of exterior floats or weights.

---

This invention relates to seismic exploration and more particularly to neutrally buoyant hydrophone streamers utilized for seismic exploration which may be maintained underwater at predetermined depths during the towing thereof.

It is customary in marine seismic exploration to tow an elongated hydrophone streamer behind a marine vessel in order to receive reflected seismic waves generated by the explosion of dynamite or the like. One of the most successful hydrophone streamers heretofore developed has comprised a flexible tube containing a plurality of hydrophones spaced along the interior length thereof, with a fluid such as kerosene, or another fuel oil, filling the remainder of the space inside the flexible tube. The kerosene utilized within the tube has a specific gravity relatively close to the specific gravity of sea water, and therefore streamers constructed in this manner have been relatively neutrally buoyant in sea water having average salinity. This state of neutral buoyancy has been found extremely advantageous in that the streamer can be towed with low noise at predetermined depths underwater without the requirement of external floats or weighting devices.

However, hydrophone streamers filled with kerosene have presented various maintenance problems, due to the fact that small tears or pinholes in the outer tubing result in fluid loss and ultimate streamer malfunction. Additionally, such small tears or pinholes allow sea water to enter the streamer and to cause subsequent malfunction of the hydrophone units. Even without the occurrence of tears or pinholes in the flexible tube, kerosene and the other fuels utilized often cause damage due to leaching of plasticizers in the flexible tubing and plastic-coated wiring, as well as present the constant threat of fires or explosions. The liquids heretofore utilized have also not been completely satisfactory with respect to providing acoustic characteristics which match the surrounding water. Additionally, the specific gravity of the kerosene or other liquids utilized has not been variable, thus preventing streamers from being specifically constructed for use in water having extremely high or low salinity.

Due to the number of problems experienced in the use of fluid-filled hydrophone streamers, numerous attempts have been made to develop a successful hydrophone streamer which utilizes solid float units. However, such attempts have generally produced unsatisfactory results, as the solid materials were either too buoyant or not sufficiently buoyant, thus requiring additional floats or weights which created noise and presented difficulties in the towing of the streamer. Additionally, many solids utilized to float hydrophone streamers have tended to be highly compressible and have therefore tended to become waterlogged and to change buoyancy when subjected to high water pressures.

In accordance with the present invention, an elongated hollow jacket having a uniform cross section encloses a plurality of hydrophones along the length thereof and is adapted to be towed behind a marine vessel to receive reflected seismic waves. Solid polymeric material, having a plurality of discrete air-filled particles distributed uniformly throughout, fills all remaining space within the hollow jacket, the combined specific gravity of the polymeric material and the air-filled particles corresponding to the specific gravity of the surrounding water so that the streamer has neutral buoyancy.

For a more complete understanding of the present invention and for further objects and advantages thereof, reference may now be had to the following description taken in conjunction with the accompanying drawings, in which:

FIGURE 1 illustrates a diagrammatic view of the present hydrophone streamer being towed at a predetermined depth underwater without the requirement of additional weights or surface floats; and FIGURE 2 illustrates a sectional portion of the hydrophone streamer shown in FIGURE 1.

Referring to FIGURE 1, a marine vessel designated generally by the numeral 10 is shown streaming an elongated hydrophone streamer 12 along a seismic exploration traverse. The hydrophone streamer 12 is connected to a tow cable 14, which is fed through a lead in (not shown) from a reel 16 mounted on board the vessel 10. The hydrophone streamer 12 has a length up to about 10,000 feet. According to the invention, streamer 12 is neutrally buoyant and may thus be towed under water at any desired depth without the necessity of external floats.

A seismic disturbance generator 18 is located on the marine vessel 10 to sequentially generate seismic waves which are reflected off substrata designated generally by the numeral 20. The upwardly reflected waves 21 are then received by hydrophones carried within the streamer 12. The hydrophones generate electrical signals representative of the reflected seismic waves, and transmit the electrical signals to circuitry on board the marine vessel 10 to provide data regarding the characteristics of the substrata 20. It will be understood that the seismic disturbances could be generated by dynamite sources towed at distances behind the marine vessel 10, if desired.

FIGURE 2 is a cross section of a portion of the hydrophone streamer 12. The outer portion of streamer 12 comprises a tubular plastic or rubber jacket 22 which has a uniform cross section throughout the length thereof to eliminate the generation of noise while being towed. A hydrophone assembly 24 is positioned within the jacket 22 to generate electrical signals in response to the reflected seismic waves. Hydrophone assembly 24 may comprise any one of a plurality of well-known hydrophones which are commonly used in seismic exploration. Although only one hydrophone assembly 24 is illustrated, it will be understood that a large number of additional hydrophones will be spaced along the length of the hydrophone streamer 12.

The electrical output signals from the hydrophone assembly 24 are transmitted to circuitry located on board the marine vessel 10 through insulated wires. The wires from each of the hydrophone assemblies are grouped together in wire bundles 26 and 28 which pass through the jacket 22 to the circuitry aboard the marine vessel 10. Each of the hydrophone assemblies 24 are bound between the wire bundles 26 and 28 by annular straps or plastic sheaths 30. A pair of plastic, annular spacer members 32 and 34 are disposed on each side of each hydrophone assembly 24, with a plurality of additional spacer members 35 (only one of which is shown) spaced along the length of the streamer. Wire members 36 connect the spacer members.

As previously noted, prior hydrophone streamers have been filled with liquids such as kerosene, such that the liquid surrounds all remaining space within the interior of the streamer. The present invention encompasses the concept of filling all remaining space inside the jacket 22 with a solid polymeric material 42 having a specific gravity approximating the specific gravity of the water in which the hydrophone streamer is to be towed. In the invention, the term "polymeric" is used as a generic expression to cover any substance which polymerizes or co-polymerizes from a liquid material or mixture to from a solid or elastomeric material.

An important aspect of the invention is the provision of minature air-filled spheres throughout the polymeric material 42 within the jacket 22. A sufficient quantity of these air-filled spheres is provided to provide neutral buoyancy to the hydrophone streamer 12. Additionally, the hollow spheres provide sufficient compression and flexural strength to maintain the cross section of the rubber jacket 22 substantially uniform even in depths of water where the pressure upon the hydrophone streamer is extremely high.

In the construction of the present streamer, the hydrophone assemblies 24 are assembled within the jacket 22 along with the wire bundles 26 and 28, the spacer members 32 and 34 and their associated structure. The polymeric matrix and the desired amount of miniature hollow spheres are mixed in a liquid state, and then poured into the jacket 22 to fill all the remaining space within the jacket 22. The mixture is allowed to cure within the jacket 22 to form an essentially noncompressible, and yet sufficiently flexible, hydrophone streamer 12 which is neutrally buoyant and which has excellent underwater acoustic properties.

Any one of a number of suitable plastics or elastomers may be used as the matrix which carries the air-filled spheres. For instance, room temperature vulcanizing silicon rubbers and silicone gels, such as the material sold under the trade names "Sylgard 51 Dielectric Gel" and "Dow Corning 96–035 RTV Encapsulant" by Dow Corning Corporation of Midland, Mich., have been advantageously utilized. Additionally, but not by way of limitation, other materials such as polybutadiene and polyurethane may be advantageously utilized as a polymeric matrix.

The particular material from which the air-filled spheres are constructed will be chosen according to the desired compressional and flexural strength desired, as well as the desired specific density and water absorption. The small hollow spheres should range from about 30 to 300 microns in diameter, although spheres of slightly different diameters may be required in some instances. The spheres may be constructed from material such as glass, phenolic, epoxy and polyethylene. A specific example of suitable spheres are the hollow glass microspheres termed "Eccospheres," manufactured and sold by Emerson and Cuming, Inc. of 869 Washington St., Canton, Mass.

As previously described, a suitable plastic matrix is intermixed with a quantity of suitable miniaturized hollow particles such that the resulting specific gravity of the mixture corresponds with the specific gravity of the water in which the hydrophone streamer is to be immersed. For instance, a room temperature vulcanizing silicone rubber or gel may be mixed with sufficient quantities of air-filled glass bubbles having diameters from 30 to 300 microns to provide a specific gravity of the mixture ranging from .72 to .82 gram per cubic centimeter. Generally, a specific gravity between .76 to .82 gram per cubic centimeter will be desired. The polymeric matrix and the intermixed hollow spheres are then poured into sections of the cable and allowed to polymerize into situ about the components of the hydrophone.

The advantages of a hydrophone streamer formed in accordance with the present invention over previously developed hydrophone streamers will be apparent. For instance, the relative specific gravity of the hydrophone streamer may be predetermined in order to provide neutral buoyancy of the hydrophone streamer in salt water having extremely high salinity. Furthermore, the present hydrophone streamer will not be affected by pinholes or tears in the outer jacket. The present solid polymeric material does not present fire hazards and maintains an essentially constant cross section of the hydrophone streamer in varying water pressures. The present invention provides a very close acoustic match to the surrounding water to provide improved reception of the reflected seismic waves.

The use of the solid polymeric material also prevents migration of salt water within the hydrophone streamer, thereby eliminating maintenance problems caused by the action of the salt water on the sensitive components within the hydrophone streamer. The wire bundles within the hydrophone streamer are relieved of substantial strain due to the supporting force of the encompassing polymeric material, a significant advantage over prior fluid-filled hydrophone streamers. The polymeric matrix and air-filled bubbles do not chemically react with the hydrophone assemblies and therefore the present hydrophone streamer may be used for long periods of time with essential freedom from maintenance problems.

Whereas the present invention has been described with respect to several specific examples, it is to be understood that various changes and modifications will be suggested to one skilled in the art, and it is desired to encompass such changes and modifications in the appended claims.

What is claimed is:

1. In a hydrophone streamer adapted to be towed underwater by a marine vessel, the combination comprising:
   (a) an elongated hollow jacket having means at one end for connection to said marine vessel,
   (b) transducer means supported within said hollow jacket at intervals along the length thereof, and
   (c) solid polymeric material polymerized in situ from a liquid filling the remaining space within said hollow jacket, said polymeric material having a specific gravity approximating the specific gravity of the surrounding water such that said jacket is maintained underwater in a state of neutral buoyance and further having acoustic properties approximating the acoustic properties of the surrounding water.

2. The streamer of claim 1 wherein said hollow jacket is flexible and has a uniform circular cross section throughout the length thereof.

3. The streamer of claim 1 and further comprising: a plurality of air-filled bubble-like particles of a material different from said polymeric material dispersed throughout said polymeric material to increase the buoyance of said streamer to the desired state of neutral buoyancy.

4. The streamer of claim 3 wherein the combined specific gravity of said polymeric material and said bubble-like particles is within the range of .72 to .82 gram per cubic centimeter.

5. A seismic exploration streamer for being towed underwater by a marine vessel comprising:
   (a) an elongated flexible jacket having a uniform hollow cross section and adapted to be towed by one end by the marine vessel,
   (b) transducer means disposed within said flexible jacket for converting seismic waves into electrical signals, (c) electrical lines for carrying said electrical signals through said flexible jacket to the marine vessel, and (d) solid polymeric material having a plurality of discrete air-filled particles of a different material distributed uniformly throughout filling the remaining space within said flexible jacket, the combined specific gravity of said polymeric material and said air-filled particles corresponding to the specific gravity of the surrounding water so that said flexible jacket is maintained underwater in a state of neutral buoyancy.

6. The seismic exploration streamer of claim 5 wherein the combined specific gravity of said polymeric material and said air-filled particles is within the range of .72 to .82 gram per cubic centimeter.

7. The seismic exploration streamer of claim 5 wherein the rate of travel of acoustic signal through said polymeric material and said air-filled particles is generally equal to the rate of travel of acoustic signals through the surrounding water.

8. The seismic exploration streamer of claim 5 wherein said polymeric material comprises a plastic.

9. The seismic exploration streamer of claim 5 wherein said polymeric material comprises an elastomer.

10. The seismic exploration streamer of claim 5 wherein said air-filled particles are formed from a plastic and have diameters ranging from 30 to 300 microns.

11. The seismic exploration streamer of claim 5 wherein said air-filled particles are formed from glass and have diameters ranging from 30 to 300 microns.

12. The seismic exploration streamer of claim 5 wherein said polymeric material with said air-filled particles mixed therewith is initially introduced into said flexible jacket in a liquid state and then cured in situ.

13. The seismic exploration streamer of claim 5 wherein said polymeric material and said air-filled particles have a compressive strength sufficient to maintain the cross-sectional area of said flexible jacket in the presence of high underwater pressures.

References Cited

UNITED STATES PATENTS

| 2,960,960 | 11/1960 | Fehlner | 114—235.2 |
| 3,158,123 | 11/1964 | Froehlich | 114—16 |
| 3,353,150 | 11/1967 | Jacox | 340—10 |
| 3,375,800 | 4/1968 | Cole et al. | 114—235.2 |

RODNEY D. BENNETT, JR., Primary Examiner

BRIAN L. RIBANDO, Assistant Examiner

U.S. Cl. X.R.

114—235